(12) United States Patent
Park et al.

(10) Patent No.: US 6,597,838 B1
(45) Date of Patent: Jul. 22, 2003

(54) GRATING-ASSISTED CO-DIRECTIONAL VERTICAL COUPLER OPTICAL FILTER HAVING WELL-SUPPRESSED SIDELOBE CHARACTERISTICS AND METHOD OF FABRICATING THE SAME

(75) Inventors: Chan Yong Park, Daejeon (KR); Seung Won Lee, Daejeon (KR); Dug Bong Kim, Pusan (KR); Kwang Ryong Oh, Daejeon (KR); Hong Man Kim, Daejeon (KR)

(73) Assignees: Electronics and Telecommunications Research Institute, Daejeon (KR); Korea Telecom, Seoul (KR)

( * ) Notice: Subject to any disclaimer, the term of this patent is extended or adjusted under 35 U.S.C. 154(b) by 0 days.

(21) Appl. No.: 09/135,730

(22) Filed: Aug. 18, 1998

(30) Foreign Application Priority Data

Aug. 19, 1997 (KR) .............................. 97-39416

(51) Int. Cl.⁷ ................................. G02B 6/34
(52) U.S. Cl. ......................... 385/37; 385/10; 385/31; 385/131
(58) Field of Search ............................ 385/31, 37, 131, 385/10

(56) References Cited

U.S. PATENT DOCUMENTS

| 5,396,365 A | 3/1995 | Gustavsson |
| 5,495,543 A | 2/1996 | Alferness et al. |
| 5,502,783 A | 3/1996 | Wu |
| 5,515,461 A | 5/1996 | Deri et al. |
| 5,621,828 A | 4/1997 | Baets et al. |

OTHER PUBLICATIONS

Sidelobe suppression in grating-assisted wavelength-selective couplers; Hajime Sakata; 1992; pp. 463–465.

*Primary Examiner*—James Phan
(74) *Attorney, Agent, or Firm*—Antonelli, Terry, Stout & Kraus, LLP

(57) ABSTRACT

The present invention relates to an optical filter whose a sidelobe disturbing a characteristic of an optical filter by weighting an optical coupling efficiency between waveguides is controlled upon applying a selective area growth method in a wavelength selective variable semiconductor optical filter and method of fabricating the same. The present invention can control the thickness of growth layer selectively by controlling the width of the dielectric thin film mask whose the growth is not achieved in the selective area growth method, can control the distance between two waveguides of the wavelength selective variable semiconductor optical filter by applying the result on the distance control between two waveguides. Accordingly, there can be changed an optical coupling efficiency between two waveguides spatially. Because the sidelobe characteristics is largely improved if the distance between two waveguides is controlled temporarily to be corresponded to one period of Hamming function, there can be fabricated a semiconductor optical filter whose the characteristic is very excellent when applying the present invention.

13 Claims, 7 Drawing Sheets

GRATING-ASSISTED CO-DIRECTIONAL VERTICAL COUPLER OPTICAL FILTER HAVING WELL-SUPPRESSED SIDELOBE CHARACTERISTICS AND METHOD OF FABRICATING THE SAME

BACKGROUND OF THE INVENTION

1. Field of the Invention

The present invention relates to a tunable optical filter (hereinafter, called TOF) having a wavelength selective property used in an optical communication of a wavelength division multiplexing(hereinafter, called WDM) and method fabricating the same and, more particularly, to an optical filter whose sidelobe disturbing characteristics of an optical filter by weighting coupling efficiency between waveguides is controlled upon applying a selective region growth method in a wavelength selective variable semiconductor optical filter and method of fabricating the same.

2. Discription of the Prior Art

Generally, the structure for realizing the optical filter are several, however, there are often used a Grating-Assisted Co-directional Coupler(GACC) filter coupled in vertical using a semiconductor material whose an integration of an optical device is good. In the structure of a conventional grating assisted co-directional coupler optical filter, there is generated an optical couple upon inserting lattices between two optical waveguides as shown in FIG. 1, the light incident in one waveguide is used as a signal light upon being taken out in the other waveguide. At this time, the lattice 13 functions as coupling light between two waveguides, when two waveguides are asymmetric, only any special wavelength is coupled to other waveguide. The grating assisted co-directional coupler as above can change the wavelength of light generated to a second waveguide by changing the refractivity of the waveguide using a current injection or electric field effect. When an i-th wavelength ($\lambda i$) is outputted from the wavelength variable optical filter as above to the second waveguide, if a (i+1)-th or (i−1)-th wavelength are outputted to the second waveguide, there is generated an error for detecting an i-th wavelength. Accordingly, to generate only the i-th wavelength to the second waveguide, it is ideal that an optical wavelength spectrum coupled to the second waveguide from the first waveguide must be 0 on the (i−1)-th wavelength adjacent to the (i+1)-th wavelength. However, the optical filter structure shown in FIG. 1 has a form such as an output spectrum coupled to the second waveguide is shown in a slender line 1 of FIG. 3 relative to an optical wavelength change and a small peak value 1a called a sidelobe from the right and left of the central wavelength. Since a channel adjacent according to the position of this sidelobe is influenced, the remove of the sidelobe is essential so that the optical filter can be practical. This sidelobe is a cause to keep an optical couple efficiency between two waveguides constant because the distance between two waveguides is constant as shown in FIG. 1.

In conventional, a first and second waveguide were fabricated on the same plane through a photo-mask work such as a semiconductor process in the form of plane. However, in the case of fabricating an optical filter in the plane form, the distance control between two waveguides is easy, however there is a shortcoming that the wide band is very enlarged because the shape of the waveguide is not even and it is difficult to insert the lattice, therefore, there was performed an optical filter fabrication using $LiNbO_3$ single crystal without performing the crystal growth. However, in the case of an optical filter using the semiconductor, because the crystal growth can be possible by an epitaxial growth method, there was possible the optical filter fabrication in the form of a vertical couple, in the case of a crystal growth, it is possible to fabricate an optical filter of an excellent characteristic because the distance between two waveguides is accurately controlled and a parameter control giving an effect on the characteristic of a filter such as a thickness, width of the waveguide is accurately achieved.

SUMMARY OF THE INVENTION

It is an object of the present invention to provide an optical filter whose sidelobe is controlled upon changing the waveguide distance as well as accurately controlling a characteristic since a first waveguide and a second waveguide are fabricated in the form of vertical couple to restrain a sidelobe, namely, one of an important characteristic of the filter and improve the characteristic of the optical filter due to providing a spatial additional value with an optical couple efficiency by means of a selective area growth(SAG) between two waveguides and method of fabricating the same.

In order to accomplish the above object, the present invention provides a grating assisted vertical coupling optical filter whose sidelobe is controlled. Such an optical filter comprises: an n-type InP substrate; an InGaAsP first waveguide layer accumulated in the thickness of 0.3~0.8 $\mu$m on said n-type InP substrate, limited in spatial to have the width of 1~3 $\mu$m and the length of 3~10 mm; an n-type InGaAsP grating layer formed in the separation of 0.1~0.5 $\mu$m from the first waveguide layer, limited in spatial to have the thickness of 0.02~0.2 $\mu$m and the period of 10~30 $\mu$m; an n-type InP layer accumulated in the thickness of 1~3 $\mu$m on the n-type InGaAsP lattice layer; a p-type InGaAsP second optical waveguide layer accumulated in the thickness of 0.2~1 $\mu$m on said n-type InP, limited in spatial to have the width of 1~5 $\mu$m of and the length of 3~10 mm; and a p-type InP clad layer accumulated in the thickness of 1~3 $\mu$m on the second optical waveguide layer wherein, the distance between the two waveguides nearest at the middle portion of the optical filter is 0.5~1.5 $\mu$m, and farthest at both ends of the optical filter is 2~4 $\mu$m.

In order to accomplish the above object, the present invention provides a method of fabricating a grating assisted vertical coupling optical filter. Such a method comprises steps of: growing an InGaAsP of material consisting a first waveguide on a InP substrate by an organic metal vapor deposition method(OMVPE), to be patterned to have the width of 1~3 $\mu$m; forming an InP layer and a grating layer thereon, to be patterned to have the period of 10~40 $\mu$m; patterning a dielectric thin film deposited thereon; forming an InP layer thereon by a selective area growth method, and controlling the thickness in spatial; growing an InGaAsP of material consisting a second waveguide on the InP substrate, forming a second waveguide upon being patterned to have the width of 1~5 $\mu$m in the strip form; and controlling a sidelobe upon growing said InP thereon.

BRIEF DESCRIPTION OF THE DRAWINGS

The above and other objects and features of the present invention will become apparent from the following description of preferred embodiments, when taken in conjunction with the accompanying drawings, in which:

FIG. 4b is a change view of InP thickness according to the position in FIG. 4a.

FIG. 5 is an experimental result view of the embodiment of FIG. 4a.

DETAILED DESCRIPTION OF THE PREFERRED EMBODIMENTS

Hereinafter, the present invention will be explained in detail with reference to drawings attached.

Figure 1:
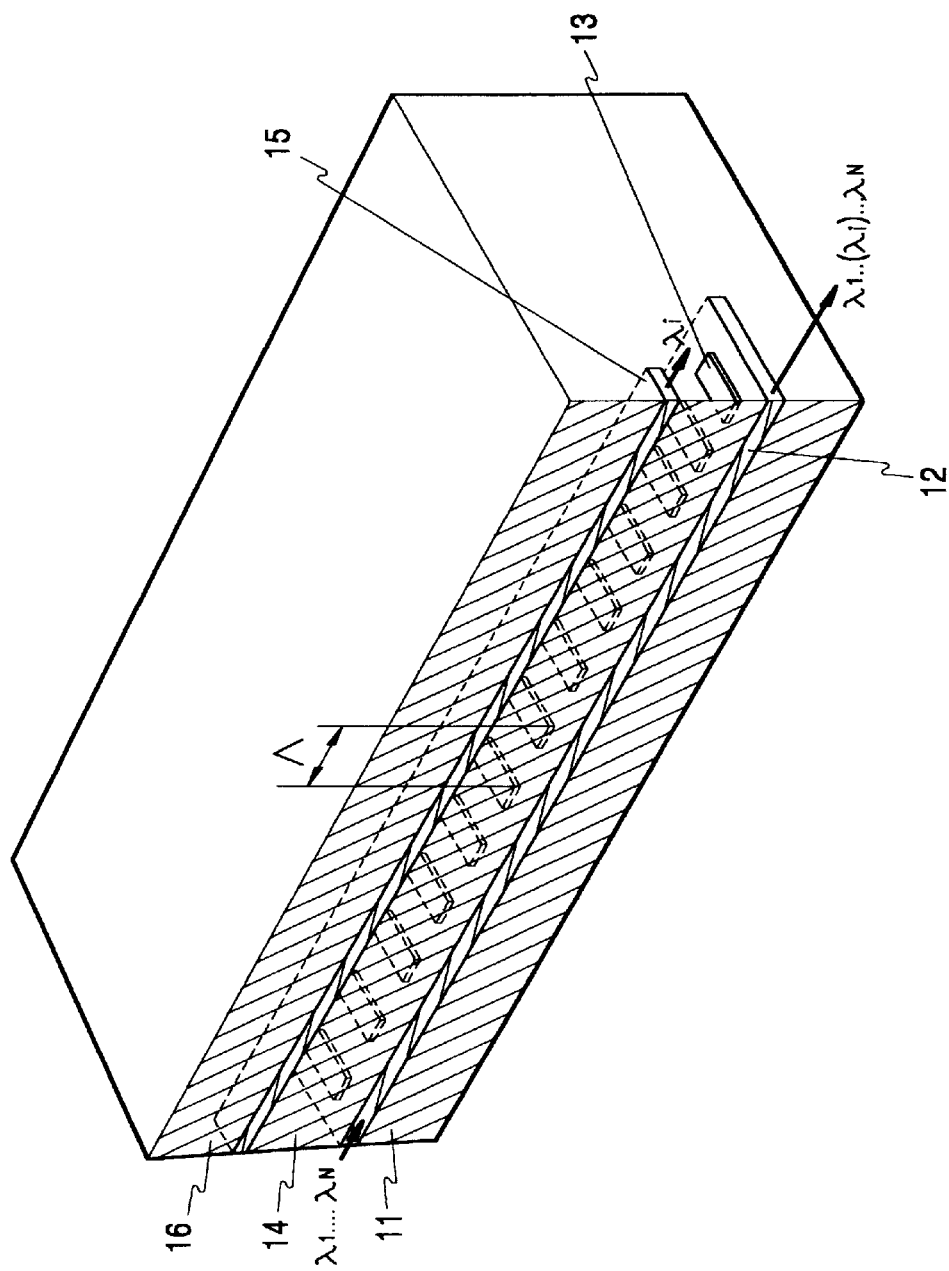
FIG. 1 is a sectional view of a conventional vertical coupling grating assisted wavelength variable optical filter.
Figure 2:
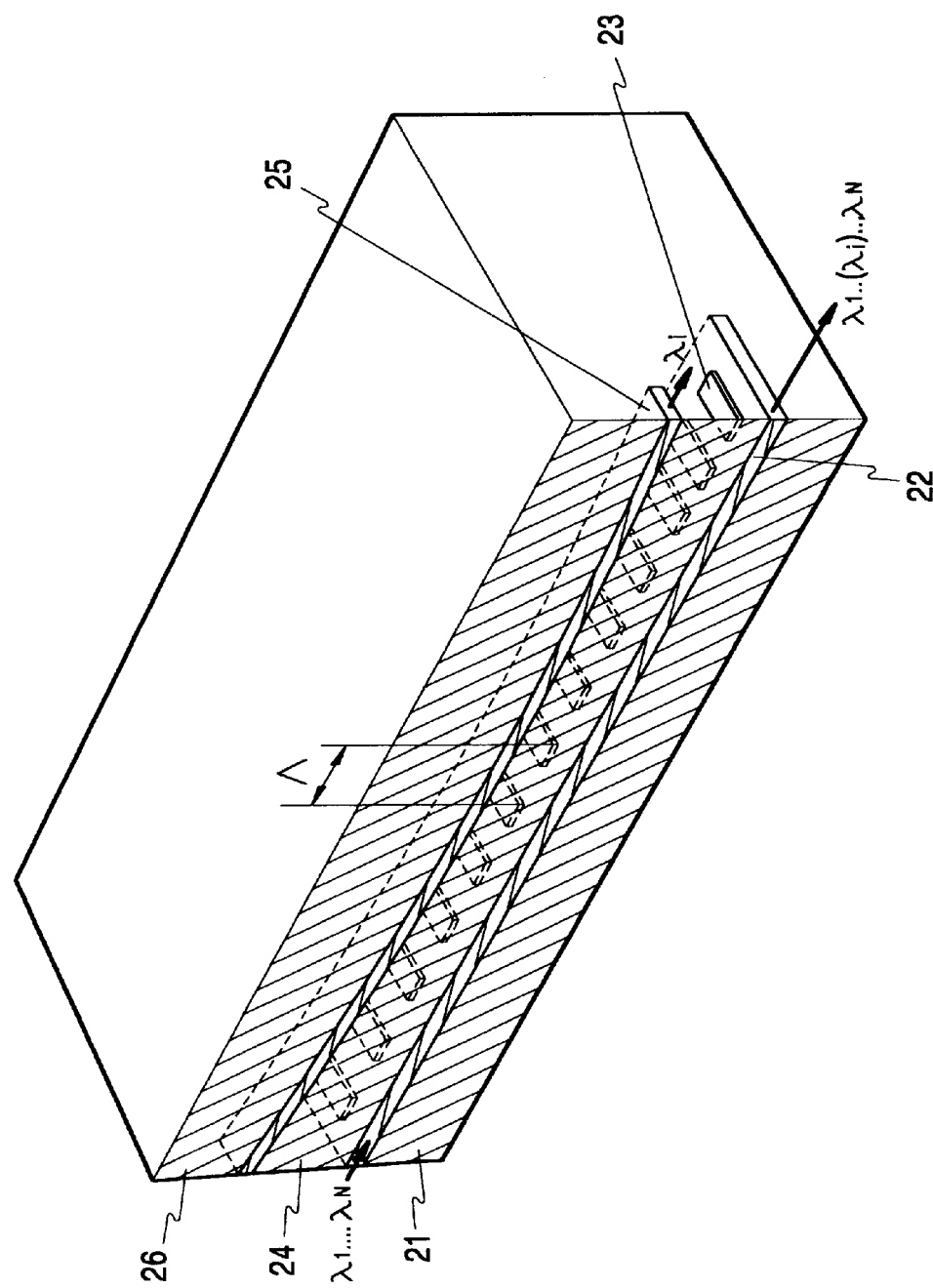
FIG. 2 is a sectional view of a vertical coupling grating assisted wavelength variable optical filter of the present invention.

FIG. 2 is a construction view of a vertical coupling grating assisted wavelength variable optical filter suggested in the present invention.

As shown in FIG. 2, an optical filter of the present invention comprises an n-type InP substrate 21, an n-type InP buffer layer accumulated in the thickness of 0.5~1 μm thereon, an InGaAsP first waveguide layer 22 accumulated in the thickness of 0.3~0.8 μm thereon, limited in spatial to have the width of 1~3 μm, and the length of 3~10 μm, an n-type InGaAsP grating layer 23 formed in the distance of 0.1~0.5 μm from the first waveguide layer 22, limited in spatial to have the period of 10~30 μm, the thickness of 0.02~0.2 μm, an n-type InP layer 24 accumulated in the thickness 1~3 μm, a p-type InGaAsP second optical waveguide layer 25 accumulated in the thickness of 0.2~1 μm, limited in the space to have the width of 1~5 μm, and the length of 3~10 mm thereon, and a p-type InP clad layer 26 accumulated in the thickness of 1~3 μm thereon.

Figure 3:
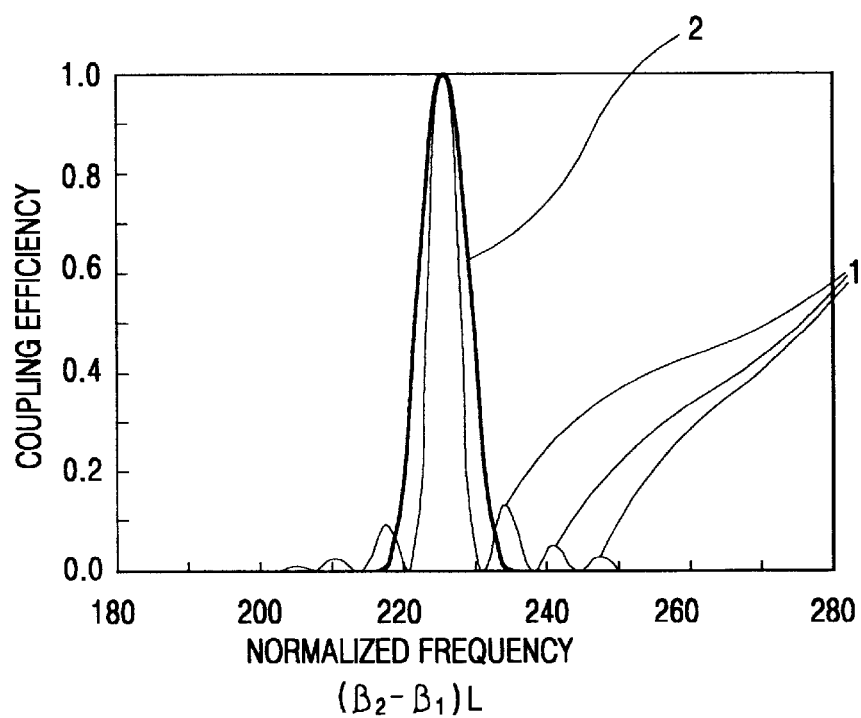
FIG. 3 is transmission characteristics comparative view of a vertical coupling grating assisted wavelength variable optical filter of the present invention and a conventional vertical coupling grating assisted wavelength variable optical filter.

In this structure, there is consisted an InP between InGaAsP first and second waveguide layers whose a band gap is high, a middle portion distance thereof is nearest as the distance of 0.5~1.5 μm, both end terminals is farthest as the distance of 2~4 μm. If a coupling coefficient between two waveguides satisfies the following formula known as Hamming function, the sidelobe is controlled as shown in the thick line in FIG. 3. That is, when the middle portion of an optical filter in FIG. 2 is z=0, and the coupling coefficient κ(z) satisfies the following formula, the sidelobe is suppressed largely.

$$\kappa(z) = \kappa_0 \left[1 + 0.852\cos\left(\frac{2\pi z}{L}\right)\right]$$

The bandwidth is increased in the optical filter constructed as above. However, even though the bandwidth is increased, the sidelobe may be reduced so that the optical filter can be used in the actual system. Therefore, the optical filter constructed in the vertical couple form as above has a special advantage.

The optical filter having the construction above is illustrated in the basic structure only, if the electrode is formed in order to inject current into the optical filter, it can be operated by a waveguide variable optical filter. That is, there are formed a p-type electrode to an upper surface of the optical filter, and a n-type electrode to a lower surface of the optical filter so that a wavelength change of the couple light by means of the current injection or electric field effect can be realized.

Further, if a double lattice is formed so that the n-type InGaAsP lattice layer can be suitable to the respective lights TE- and TM- polarized, it can be operated by the wavelength variable optical filter which is polarization-independent. That is, the n-type InGaAsP lattice layer period can be formed independent to the polarization upon forming the lattice periods corresponded to TE polarization and TM polarization in a double simultaneously.

Figure 4A:
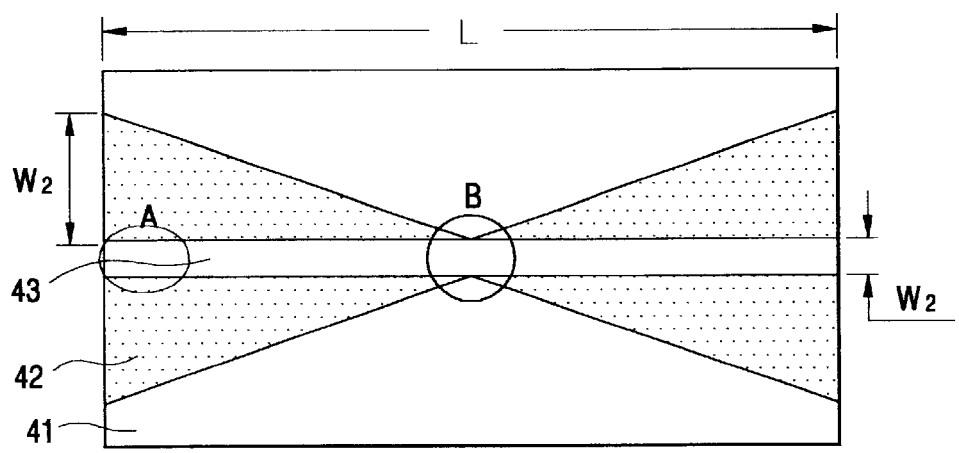
FIG. 4a is a construction view of a substrate pattern before SAG growth to achieve functional form of growth thickness according to the present invention.
Figure 4B:
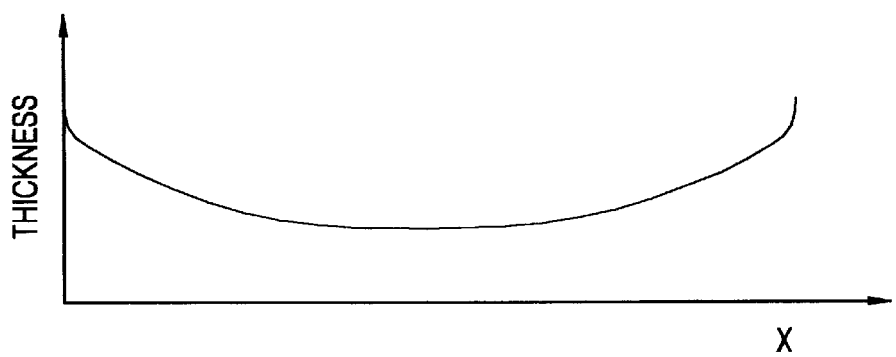
Figure 5:
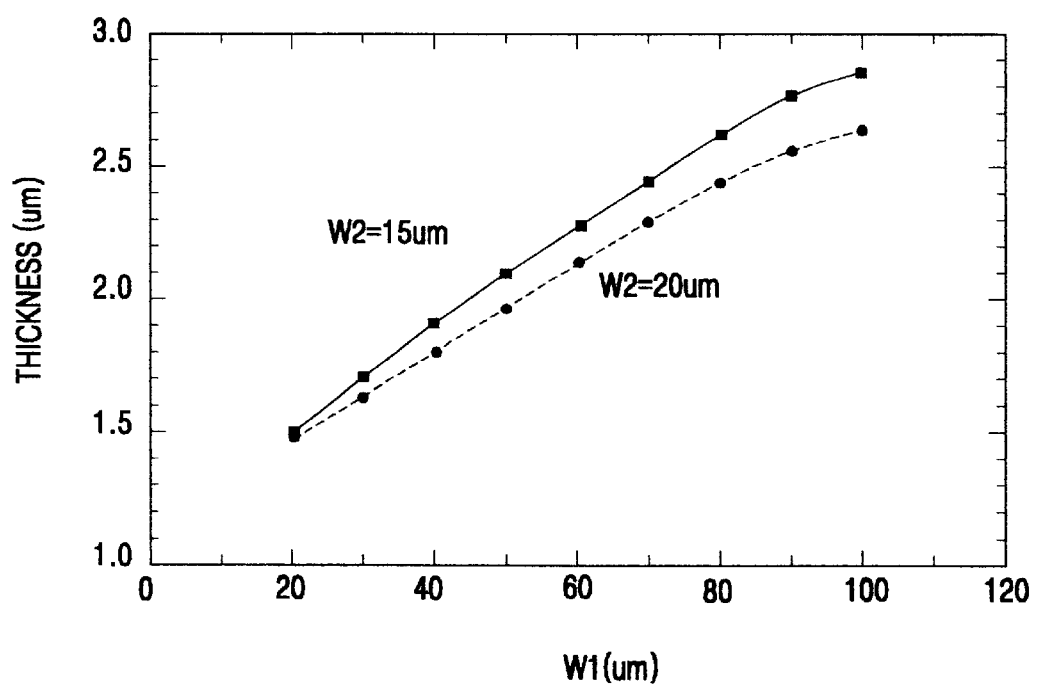

The embodiments to realize the construction of the present invention are shown in FIGS. 4a, 4b, and FIGS. 6a through 6f. In the semiconductor crystal growth, if a dielectric thin film pattern is formed on a SiNx dielectric thin film 42 portion on the semiconductor surface in FIG. 4a, since the lattice structure of the dielectric thin film is different from the semiconductor, the crystal is not grown on the dielectric thin film, but on the semiconductor. The crystal growth method as above is called a selective area growth (SAG). In the SAG, because growth materials(when growing InP, In-atom and P-atom) arrived on the dielectric thin film are not grown on the dielectric thin film, they move to the side surface, accordingly, to be grown in the thickness on the boundary area of the dielectric thin film and the semiconductor. Accordingly, the wider the pattern of the dielectric thin film is, the more the growth material is moved to the lateral. Therefore, the growth of the boundary area is formed in the thicker. In the case forming the dielectric thin film as FIG. 4a, the A-region of FIG. 4a is thicker than the B-region, therefore, it can be applied to embody the optical filter structure as FIG. 2. FIG. 4b shows the thickness of InP grown on the semiconductor 43 between the dielectric thin film patterns according to the position(x). There can be attained the proposed purpose to embody the structure of FIG. 2 by changing the width of the dielectric thin film. In FIG. 4, it is suitable that the maximum width (W1) of the dielectric thin film is 100~200 μm, the semiconductor width (W2) between the dielectric thin film pattern is 2~30 μm. FIG. 5 shows an experiment result grown. The grown thickness is changed according to the change of W1, W2 of FIG. 4a, accordingly, which can sufficiently embody the structure in FIG. 2.

Figure 6A:
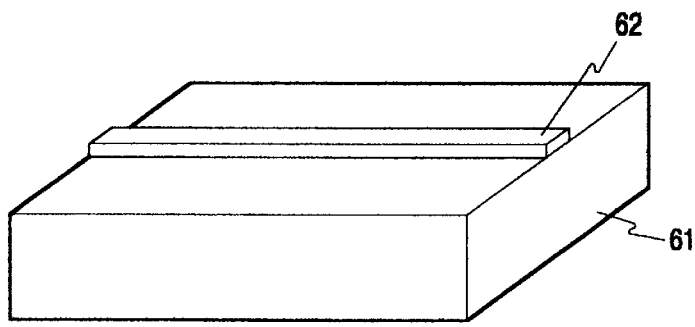
FIGS. 6a through 6f are fabrication processes view of a vertical coupling grating assisted wavelength variable optical filter of the present invention.
Figure 6B:
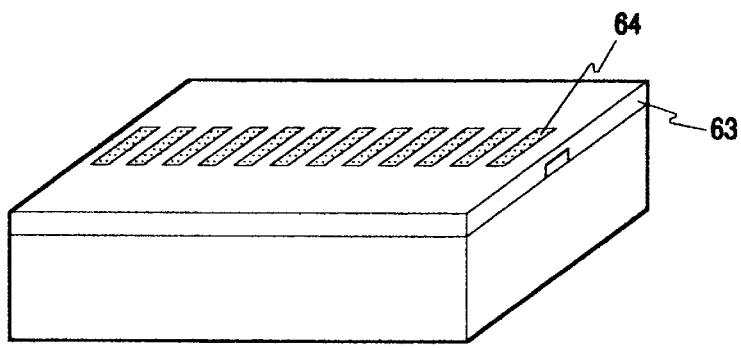
Figure 6C:
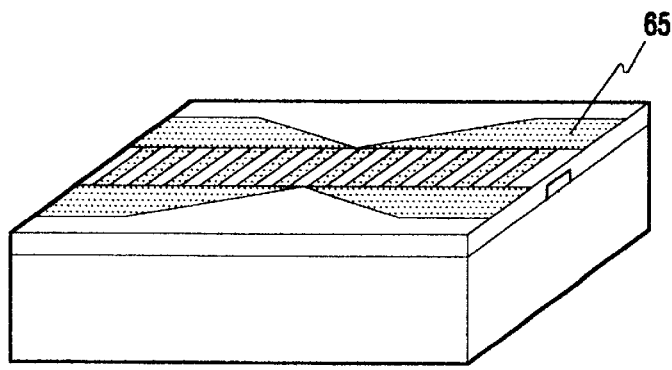

A method of fabricating a grating assisted vertical coupling optical filter is illustrated through FIGS. 6a–6c as follows: first, after growing an InGaAsP material constructing a first waveguide 62 on the InP substrate by a vapor deposition method(VPE) or an organic metal vapor deposition method (OMVPE) or liquid deposition method(LPE), then to patternized to have a constant width (FIG. 6a). An InP layer 63 and grating layer 64 are grown thereon, to be patterned with a rectangular type whose only the grating layer is designed(FIG. 6b). After depositing an dielectric thin film thereon, the lattice pattern is formed as shown in FIG. 6c. When forming the lattice pattern, the width of the middle portion of the optical filter can be narrow, and the width of the end portion can be wide, to control the thickness between two waveguides by a selective area growth method.

Figure 6D:
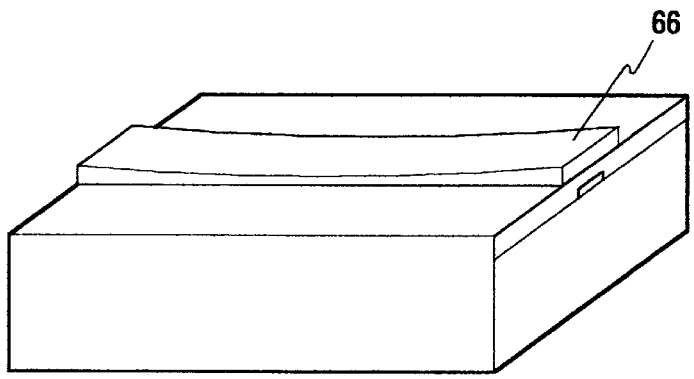
Figure 6E:
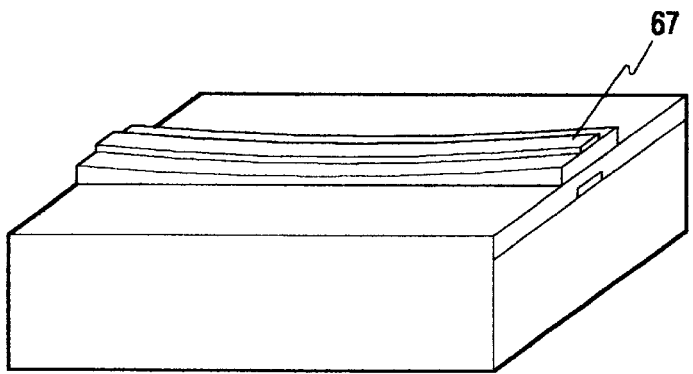
Figure 6F:
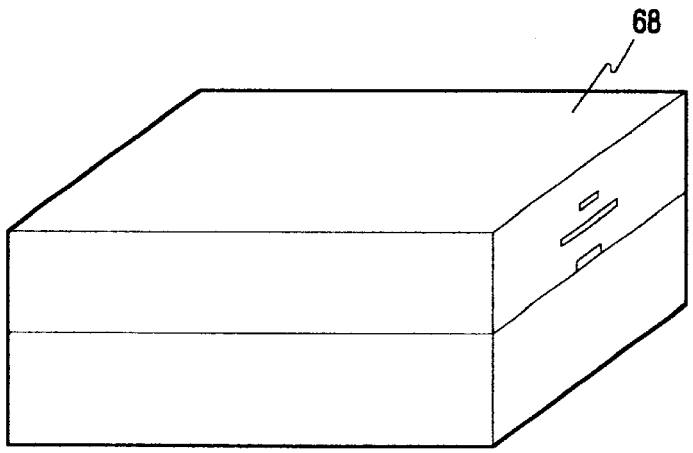

If growing the InP crystal on the lattice pattern by a selective area growth method an InP epitaxial layer 66 whose thickness is controlled spatially as FIG. 6d is obtained. After growing the InGaAsP layer of a second waveguide a second waveguide 67 (FIG. 6e) is formed after being patterned in the form of strip to have a constant width. If the waveguide in the semiconductor is formed upon growing InP on the whole surface, the optical filter is accomplished (FIG. 6f) with the structure shown in FIG. 2.

Because the optical filter fabricated as described above does not have a constant value of the optical coupling efficiency between two waveguides but can provide the spatial change, to obtain a waveform whose the sidelobe providing the disturbance for real application is removed. Accordingly, the crosstalk characteristic between adjacent channels of WDM communication can be considerably improved.

As described above, although the present invention has been described in detail with reference to illustrative embodiments, the invention is not limited thereto and various modifications and changes may be effected by one skilled in the art within the scope of the invention.

What is claimed is:

1. A grating assisted vertical coupling optical filter whose sidelobe is controlled, comprising:
   an n-type InP substrate;
   an InGaAsP first waveguide layer accumulated in the thickness of 0.3–0.8 $\mu$m on said n-type InP substrate, limited in spatial to have the width of 1–3 $\mu$m and the length of 3–10 mm;
   an n-type InGaAsP grating layer formed in the separation of 0.1–0.5 $\mu$m from said InGaAsP first waveguide layer, limited in spatial to have the thickness of 0.02–0.2 $\mu$m and the period of 10–30 mm;
   an n-type InP accumulated in the thickness of 1–3 $\mu$m on said n-type InGaAsP grating layer;
   a p-type InGaAsP second waveguide layer accumulated in the thickness of 0.2–1 $\mu$m on said n-type InP, limited in spatial to have the width of 1–5 $\mu$m and the length of 3–10 mm; and
   a p-type InP clad layer accumulated in the thickness of 1–3 $\mu$m on said p-type InGaAsP second waveguide layer, the distance between the waveguides being nearest as the distance of the middle portion of the optical filter is 0.5–1.5 $\mu$m, farthest as the distance of both ends is 2–4 $\mu$m.

2. The grating assisted vertical coupling optical filter whose sidelobe is controlled according to claim 1, wherein said optical filter comprises a p-type electrode thereon, a n-type electrode therebelow so that the wavelength change of a coupled light by a current injection or electric field effect can be realized.

3. The grating assisted vertical coupling optical filter whose sidelobe is controlled according to claim 1, wherein said n-type InGaAsP grating layer is constructed to be independent to a polarization upon forming a lattice period corresponded to TE polarization and TM polarization in a double simultaneously.

4. A grating assisted vertical coupling optical filter whose sidelobe is controlled, comprising:
   a substrate;
   a first optical waveguide formed on a predetermined region of said substrate, said first optical waveguide having a thickness of 0.3–0.8 $\mu$m, a width of 1–3 $\mu$m and a length of 3–10 mm;
   a first clad layer formed on said substrate including said first optical waveguide, said first clad layer having a plurality of lattices formed on said first optical waveguide along said predetermined region of said substrate, and separated from said first optical waveguide by 0.1–0.5 $\mu$m, said plurality of lattices having a thickness of 0.02–0.2 $\mu$m and each being separated from adjacent lattices by 10–30 $\mu$m;
   a second optical waveguide formed on said first clad layer along said predetermined region of said substrate, said second optical waveguide having a thickness of 0.2–1 $\mu$m, a width of 1–5 $\mu$m and a length of 3–10 mm; and
   a second clad layer formed on said first clad layer including said second optical waveguide along said predetermined region of said substrate,
   wherein the distance between said first optical waveguide and said second optical waveguide at the middle is 0.5–1.5 $\mu$m, and at both ends is 2–4 $\mu$m.

5. The grating assisted vertical coupling optical filter according to claim 4, further comprising a p-type electrode formed on an upper surface of said optical filter, and a n-type electrode formed on a lower surface of said optical filter such that a wavelength change of a coupled light by a current injection or an electric field effect can be realized.

6. The grating assisted vertical coupling optical filter according to claim 4, wherein said first optical waveguide and said second optical waveguide correspond to InGaAsP waveguides.

7. The grating assisted vertical coupling optical filter according to claim 4, wherein said substrate corresponds to a n-type InP substrate, said first clad layer corresponds to a n-type InP clad layer, and said second clad layer corresponds to a p-type InP clad layer.

8. The grating assisted vertical coupling optical filter according to claim 4, wherein said plurality of lattices function as a co-directional coupler to change a wavelength of an incoming light using a current injection or an electric field effect.

9. An optical filter, comprising:
   a substrate;
   a first InGaAsP optical waveguide formed on a predetermined region of said substrate;
   a first InP clad layer formed on said substrate including said first InGaAsP optical waveguide, said first InP clad layer having a plurality of lattices formed on said first InGaAsP optical waveguide along said predetermined region of said substrate, and separated from said first InGaAsP optical waveguide by 0.1–0.5 $\mu$m, said plurality of lattices having a thickness of 0.02–0.2 $\mu$m and each being separated from adjacent lattices by 10–30 $\mu$m;
   a second InGaAsP optical waveguide formed on said first InP clad layer along said predetermined region of said substrate; and
   a second InP clad layer formed on said first InP clad layer including said second InGaAsP optical waveguide along said predetermined region of said substrate,
   wherein the distance between said first optical waveguide and said second optical waveguide at the middle is 0.5–1.5 $\mu$m, and at both ends is 2–4 $\mu$m.

10. The optical filter according to claim 9, further comprising a p-type electrode formed on an upper surface of said optical filter, and a n-type electrode formed on a lower surface of said optical filter such that a wavelength change of a coupled light by a current injection or an electric field effect can be realized.

11. The optical filter according to claim 9, wherein said first optical waveguide exhibits a thickness of 0.3–0.8 $\mu$m, a width of 1–3 $\mu$m and a length of 3–10 mm, and said second optical waveguide exhibits a thickness of 0.2–1 μm, a width of 1–5 μm and a length of 3μ10 mm.

12. The optical filter according to claim 9, wherein said substrate corresponds to a n-type InP substrate, said first InP clad layer corresponds to a n-type InP clad layer, and said second InP clad layer corresponds to a p-type InP clad layer.

13. The optical filter according to claim 9, wherein said plurality of lattices function as a co-directional coupler to change a wavelength of an incoming light using a current injection or an electric field effect.

* * * * *